Feb. 13, 1934.    G. D. SUNDSTRAND    1,947,234
MACHINE FOR TRUING BRAKE DRUMS
Filed Dec. 21, 1928    2 Sheets-Sheet 1
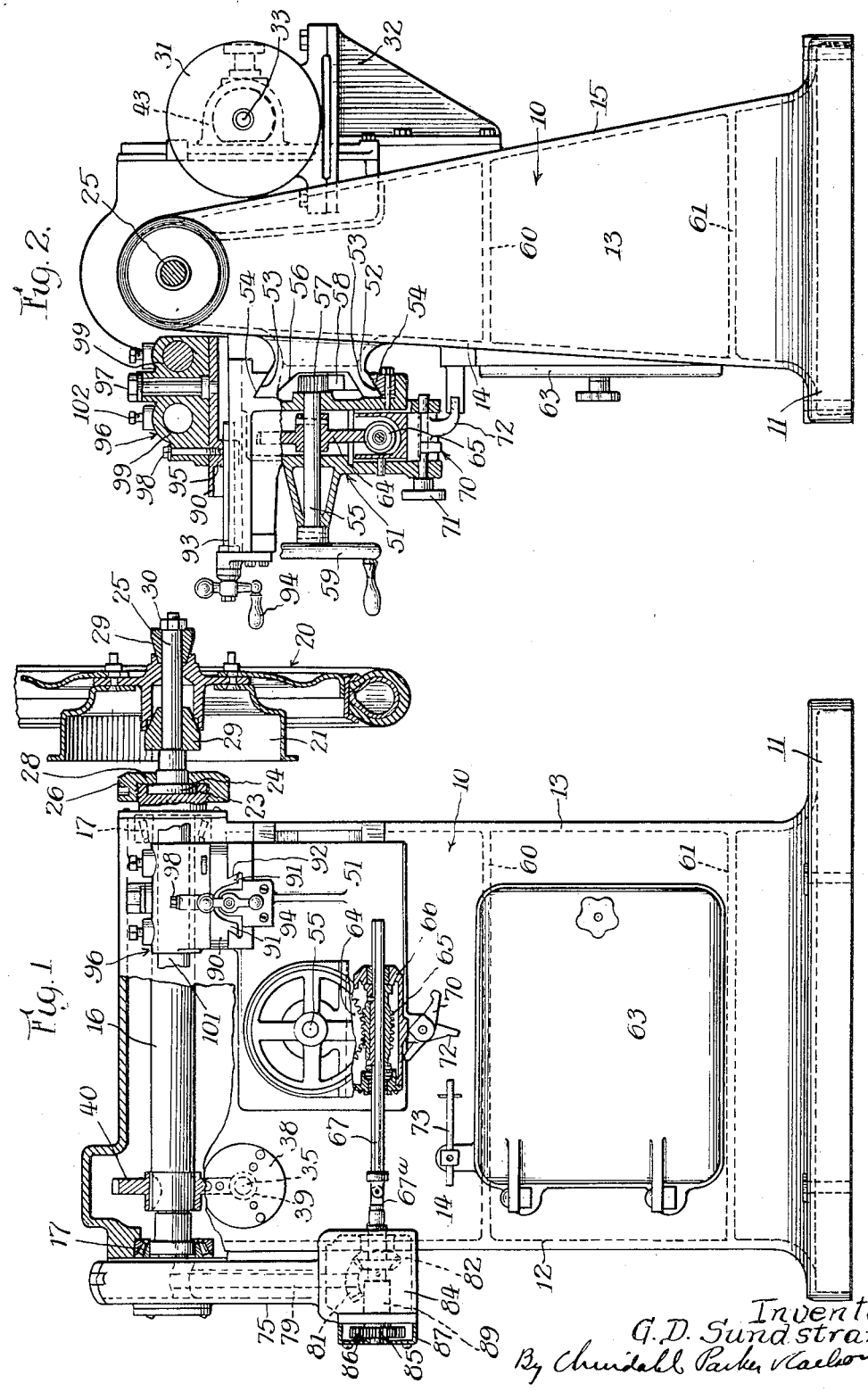

Feb. 13, 1934.     G. D. SUNDSTRAND     1,947,234
MACHINE FOR TRUING BRAKE DRUMS
Filed Dec. 21, 1928     2 Sheets-Sheet 2
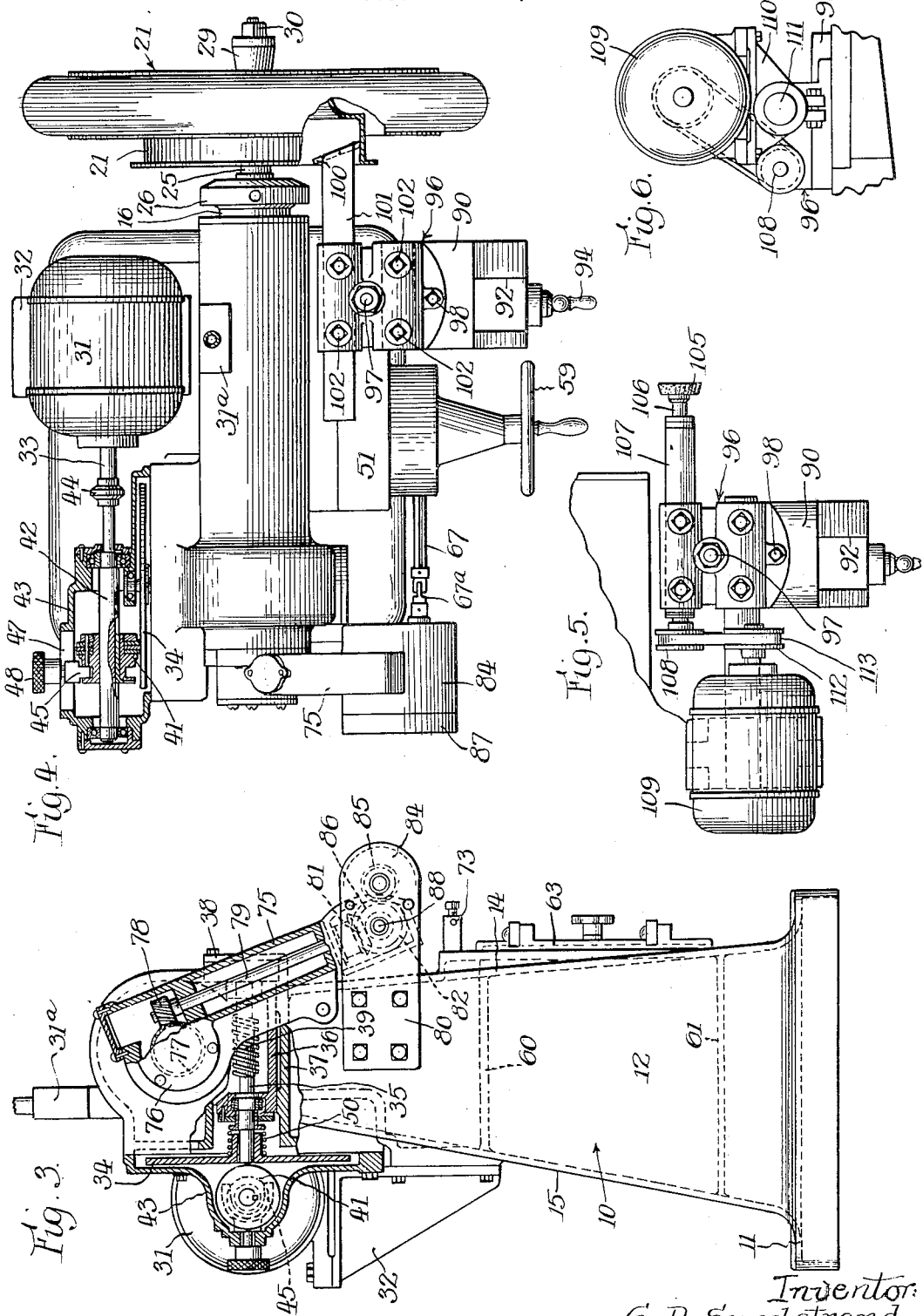

Patented Feb. 13, 1934

1,947,234

UNITED STATES PATENT OFFICE

1,947,234

MACHINE FOR TRUING BRAKE DRUMS

Gustaf David Sundstrand, Rockford, Ill., assignor, by mesne assignments, to Mattison Machine Works, Rockford, Ill., a corporation of Illinois Application December 21, 1928
Serial No. 327,628

9 Claims. (Cl. 51—50)

The invention relates generally to a machine for truing the peripheral surfaces of a brake drum or the like.

The general object of the invention is to provide a machine of this character for use in repair or service shops, equal in design, construction, and accuracy of operation to those used in automobile manufacturing plants, having a simplified cycle of operation to facilitate its use in such repair shops, and providing a wide range of adjustment to care for the variety of sizes and kinds of brake drums to be refinished.

Another object is to provide such a machine self contained in character and constructed so as to be readily installed and economical of floor space, and adapted rapidly and economically to refinish brake drums of various sizes and kinds regardless of the type of wheel upon which they are mounted and without removing the tires therefrom.

Another object is to provide a machine of this character which is readily and easily adaptable for the performance of either a grinding or a cutting operation on the periphery of a brake drum or the like.

A further object of the invention is to provide a new and improved machine of this character having a main frame in the form of a pedestal or column adapted for floor mounting, a rotatably mounted horizontal spindle extending transversely of the upper end of the pedestal and projecting out of one side of the pedestal about waist-high so that a workman may readily mount a wheel and its associated brake drum on the spindle for rotation thereby, a motor mounted on the rear side of the pedestal spaced from the floor and having a driving connection with the spindle, a tool carriage mounted on ways on the forward side of the pedestal for sliding movement parallel to the spindle, and means for actuating the carriage.

Other objects and advantages will become apparent from the following description taken in connection with the accompanying drawings, in which:

Figure 1 is a front elevational view, partially in section, of the preferred form of the invention.

Fig. 2 is an end elevational view partially in section of the machine as viewed from the right in Fig. 1.

Fig. 3 is an end elevational view partially in section of the machine as viewed from the left in Fig. 1.

Fig. 4 is a plan view partially in section.

Fig. 5 is a fragmental plan view of the machine with a grinding device mounted thereon.

Fig. 6 is a left end view of the portion of the machine shown in Fig. 5.

While the invention is susceptible of various modifications and alternative constructions, I have shown in the drawings and will herein describe in detail the preferred embodiment, but it is to be understood that I do not thereby intend to limit the invention to the specific form disclosed but intend to cover all modifications and alternative constructions falling within the spirit and scope of the invention as expressed in the appended claims.

In the form chosen for disclosure herein, the invention comprises a base or frame in the form of a pedestal or column 10 having a bottom flange 11 adapted to be secured to the floor. The frame 10 has vertical side walls 12 and 13 and forward and rear walls 14 and 15, extending upwardly from the bottom flanges to form the pedestal which is adapted to support the various parts of the machine. As shown in Figs. 2 and 3, the walls 14 and 15 converge toward the top and are joined together to provide a closed housing.

A horizontal spindle 16 extends transversely through the upper end of the pedestal and is rotatably journaled in the end walls 12 and 13 by means of anti-friction bearings 17. The spindle 16 extends beyond the bearings 17 at both ends and on one end, the right as shown in Fig. 1, the spindle 16 is provided with suitable work supporting means adapted to receive and support an automobile wheel 20 and its associated brake drum 21 (shown in Figs. 1 and 4). In the preferred form illustrated, the spindle 16 is positioned at substantially the height of a workman's waist so as to facilitate the mounting of a wheel thereon.

Because of the variety of sizes and designs of wheels which must be mounted on the spindle 16, the work supporting means is preferably arranged so as to be readily changeable and to this end the spindle 16 has an axial bore 23 formed in its end to receive and center the flanged end 24 of a work supporting device such as a stub shaft 25 herein illustrated. The shaft 25 or other work support is clamped to the spindle 16 by a nut 26 having an inwardly extending flange 28 engaging the flanged end of the shaft 25. The wheel may, of course, be centered and secured on the shaft 25 by any well known means such as by two tapered adapters 29 engaging the two sides thereof and clamped in position thereon by a nut 30.

For the purpose of driving the spindle 16 a motor 31 is employed and in the preferred form illustrated the motor is mounted on a bracket 32 secured on the sloping rear side wall 15 of the frame adjacent the work supporting end of the spindle 16 and well above the floor so as to be in an out-of-the-way position. The motor 31 is mounted with its shaft 33 substantially parallel to the spindle 16 and a suitable driving connection is provided between the motor shaft 33 and the spindle 16. Preferably this driving connection is arranged to permit of varying the speed of rotation of the spindle 16. In the present instance a variable speed friction drive is employed having a disk 34 mounted outside the rear wall 15 of the frame 10 on the end of a shaft 35 which extends transversely beneath the spindle 16. The shaft 35 is preferably supported by spaced bearings mounted on a slide 36 removably secured within the frame. As shown herein, the slide 36 is supported in the frame by means of a cross-web 37 and is secured in position thereon by a covered plate 38 removably secured on the forward wall 14. Thus the slide 36 and the shaft 35 may be removed through the forward wall of the column. The disk 34 is slidably splined to the shaft 35 so that by removing the cover plate 38 the slide 36 and the shaft 35 may be removed from the frame 10. A worm 39 is secured on the shaft 35 for rotation therewith and engages a worm wheel 40 on the spindle.

The disk 34 is driven by a friction wheel 41 slidably splined on a shaft 42 which is rotatably supported parallel to and adjacent the disk 34 and in substantially radial position relatively thereto. In the preferred form shown the shaft 42 is supported by suitable bearings in a casing 43 which is removably secured on the rear wall 15. One end of the shaft 42 projects out of the casing 43 and is connected at 44 to the motor shaft 33. Thus the shaft 42 may be driven at a constant speed by the motor 31 and by varying the position of the friction wheel 41 on the disk 34 the rate of rotation of the spindle 16 may be varied at will.

To facilitate the changing of the speed of the spindle 16, a fork 45 is arranged to engage an annular groove in the friction wheel 41 and a handle on the fork projects through a slot 47 in the casing. A nut 48 may be threaded onto the handle whereby the friction wheel may be clamped in any adjusted position.

As shown in Fig. 3, the disk 34 is mounted on the shaft 35 so as to insure constant contact between the disk 34 and the friction wheel 41. To this end the disk 34 is constantly urged toward the wheel 41 by an expansive spring 50 surrounding the shaft 35 between the slide 36 and the disk. In the form illustrated the spindle 16 is started and stopped by starting and stopping the motor 31 as by means of a motor control switch 31ª conveniently positioned on the top of the column.

For the purpose of supporting a tool and moving it across the periphery of a brake drum supported by the spindle, a carriage 51 (Figs. 1, 2 and 4) is provided slidably mounted in a vertical position on the forward wall 14 of the frame for movement parallel to the spindle 16. Thus a pair of vertically spaced guides 52 (Fig. 2) are provided on the forward wall 14, parallel to each other and to the spindle 16 and spaced forwardly of the wall 14. The guides 52 have angularly diverging ways 53 formed thereon which are engaged by opposed surfaces 54 on the saddle 51 so as to hold the carriage in a definite relation to the ways 53 and cause it to be guided along a rectilinear path parallel to the axis of the spindle.

Power driven mechanism is preferably provided for actuating the carriage 51 to accomplish a feeding movement of the working tool for refinishing a drum surface. In the present instance this mechanism is arranged to move the carriage 51 only in a direction away from the wheel, a manually operable means being provided for adjusting the position of the carriage or for moving it in the other direction. The power driven feed mechanism comprises a stub shaft 55 (Fig. 2), rotatably mounted in the carriage 51 and extending from front to rear thereof transversely of the guides 52 and projecting out through the rear side of the carriage into a horizontal side opening groove 56 formed between the two guides 52. On the projecting rear end of the shaft 55 a pinion 57 is secured arranged to engage a rack 58 mounted in fixed position in the groove 56 between the two guides 52 and extending longitudinally thereof. Thus by rotating the shaft 55, the carriage 51 may be moved along the guides 52 and a hand wheel 59 is fixed on the forward end of the shaft 55 to facilitate such manual movement of the carriage.

By positioning the rack 58 and the stub shaft 55 between the two vertically spaced guides 52 an appreciable economy in vertical height is effected so as to provide a greater space between the floor and the bottom of the saddle. Due to the economy in height thus effected the hand wheel is at a most convenient operating height for the operator and in addition a storage cabinet may be provided in the column intermediate a pair of vertically spaced horizontal walls 60 formed in the column. A door 63 is provided on the front wall 14 to close an opening through which access may be had to this cabinet.

The stub shaft 55 also functions in the power driving means herein provided and has a worm wheel 64 fixed thereon within the carriage 51 arranged to be engaged at its lower extremity by a worm 65 rotatably mounted in suitable bearings carried by a frame 66. The frame 66 is mounted on the carriage against horizontal movement relatively thereto but is arranged for a limited vertical movement so that the worm 65 may be dropped out of engagement with the worm wheel 64. The worm 65 is slidably splined on a horizontal shaft 67 so that when the worm 65 is in engagement with the worm wheel 64, the shaft 67 may be rotated to move the carriage along the ways 52.

To stop the feeding movement of the carriage 51 the worm 65 is dropped downwardly so as to be disengaged from the worm wheel 64 and to permit such downward movement of the worm 65 a flexible connection 67ª is provided in the splined shaft 67. The worm 65 is normally held in driving engagement with the worm wheel 64 by a pivotal trip device 70 mounted in the carriage below the frame 66 so as to releasably support the frame.

An arm 72 projects downwardly from the trip device 70 so that when the carriage 51 moves to the left as shown in Fig. 1, the arm 72 will strike an abutment formed by an adjustable rod 73 to pivot the trip device 70 and release the frame 66. The worm 65 is thereby dropped out of engagement with the worm wheel 64 and the feeding movement of the carriage is stopped. The carriage may then be moved manually back to the starting point by means of the hand wheel 59 and the operation repeated by engaging the worm 65 by means of a control 71 which is attached to the trip device 70.

The splined shaft 67 is driven by means of a connection with the spindle 16, this connection preferably being of such a character as to permit of changing the relative rotative speeds of the shaft 67 and the spindle 16. For this purpose a tubular casing 75 is mounted on the end wall 12 of the column and a lateral extension 76 at the upper end of the casing 75 surrounds the end of the spindle 16. On the end of the spindle 16 within the extension 76 of the casing, a spiral gear 77 is secured in driving relation with a spiral gear 78 secured on a shaft 79 which is rotatably mounted within the casing 75.

The casing 75 extends angularly downwardly and its lower end is supported by a bracket 80 secured to the end wall 12 and projecting forwardly of the forward wall 14. The shaft 79 extends downwardly from its connection with the spindle 16 coaxially of the casing 75 and has a bevel gear 81 secured to its lower end. The gear 81 engages a similar bevel gear 82 rotatably mounted on one side wall of a housing 84 formed on the lower end of the casing 75.

One end of the splined shaft 67 is also rotatably supported by the same wall of the housing 84, the axes of the shaft 67 and the bevel gear 82 being parallel and spaced horizontally from each other. A driving connection between the bevel gear 82 and the shaft 67 is provided and in its preferred form this connection embodies a pair of readily changeable pick-off gears 85 and 86 rotatably supported outside of the housing 84 and covered and held in position by a removable flanged cover plate 87.

In the present instance the two gears 85 and 86 are permanently fixed on the ends of stub shafts 88 so that the other ends of the shafts may extend through and be rotatably supported by hubs 89 formed on the inner side of the wall of the housing 84. The ends of the stub shafts 88 which extend into the housing 84 are formed so as to provide a driving engagement with the bevel gear 82 and the shaft 67 respectively. The cover plate 87 engages the outer surfaces of the gears 85 and 86 to hold them in place and by removing the cover plate the gears may easily be changed to vary the relative speeds of the spindle 16 and the splined shaft 67, whereby to vary the feeding rate of the saddle 51.

A cross slide 90 is preferably provided for adjustably supporting a working tool so that different sizes of brake drums may be operated upon. In the present instance the cross slide 90 has a pair of spaced ways 91 on its bottom side adapted to engage a guideway 92 formed in the carriage 51 and extending transversely thereof. For the purpose of adjusting the cross slide 90 a screw shaft 93 having a hand crank 94 thereon is rotatably mounted on the carriage and engages a nut 95 on the cross slide.

A tool supporting fixture 96 is removably mounted on the cross slide 90 by means of bolts 97 and 98. In the form shown the fixture 96 has a pair of comparatively large horizontally spaced bores 99 (Fig. 2) formed therein. Thus a tool 100 mounted on a tool holder 101 may be adjustably positioned on the cross slide 90 by positioning the shaft 101 in one of the bores 99 and a pair of clamping bolts 102 are provided extending into each bore 99 for securing such a shaft in adjusted position therein. In the form herein shown the tool fixture 96 may be pivoted about the bolt 97 so that the angle of the tool supporting tool holder 101 relatively to the spindle 16 may be varied. The fixture 96 is secured in the desired angular position by the bolt 98.

The provision of this form of tool fixture is of material advantage since it is possible to mount a grinding spindle therein for operating on the periphery of the brake drum. Such a spindle is shown in Fig. 5 having a shaft 106 rotatably supported within a sleeve 107 and a grinding wheel 105 and a pulley 108 removably secured on opposite ends thereof. The sleeve 107 is of substantially the same outer diameter as the bores 99 in the fixture 96 so that the sleeve 107 may be mounted therein.

To drive the shaft 106 a motor 109 may be mounted on a clamping bracket 110 secured to a shaft 111 mounted in the other one of the bores 99. A pulley 112 on the motor 109 is directly connected to the pulley 108 by means of a belt 113.

In the operation of the machine for finishing the inner periphery of a brake drum, assuming that the motor is stopped, a wheel with its brake drum is positioned on the mandrel and is centered and secured thereon by the adapters 29 and the nut 30. The cross slide is then moved inwardly (upwardly as shown in Fig. 4), by means of the handle 94 so that the tool 100 will positively clear the inner surface of the drum. The carriage is then traversed to the right as shown in Figs. 1 and 4 until the tool is positioned at the right hand extremity of the peripheral surface to be refinished. The motor is then started and as the brake drum is rotated by the spindle 16, the tool 100 is fed radially of the drum by means of the handle 94 until the desired depth of cut has been reached. Engagement of the carriage driving means by operation of the handle 71 will then cause the tool to be fed across the periphery of the drum as it is rotated and thereby refinished the periphery of the drum across its entire width. Since an automatic trip mechanism is provided the operator may be occupied with other work during the refinishing operation.

From the foregoing it will be apparent that the invention provides a compact, accurate and economically operable drum truing machine adapted for floor mounting, having a simplified cycle of operation so that it may be used in repair shops, and possessing great operating flexibility so that it will operate efficiently and accurately upon many different sizes of brake drums made from many different kinds and grades of material.

Furthermore, the machine is readily adaptable for the performance of either a grinding or cutting operation upon either the outer or inner surface of a brake drum.

I claim as my invention:

1. A machine for refinishing brake drums without the removal of the drums from the wheels, said machine comprising, in combination, a pedestal adapted to be secured in upright position on a floor, a horizontal spindle rotatably mounted in said pedestal and projecting therefrom at substantially the height of a workman's waist so as to facilitate the mounting of a wheel with its drum on said spindle, a motor mounted on one side of said pedestal and having a driving connection with said spindle, a carriage supported and guided on the forward side of said pedestal for movement parallel to said spindle, a finishing tool mounted on said carriage for manual adjustment transversely of said spindle, manually operable means for traversing said carriage parallel to the spindle, and automatically disengageable means operable by said motor to move said carriage parallel to said spindle at a feeding speed.

2. A machine of the character described comprising a main frame in the form of a pedestal for floor mounting, a horizontal spindle rotatably mounted in said frame and projecting beyond one end thereof, means removably mounted on the projecting end of said spindle adapted to support a wheel and an associated brake drum for rotation by said spindle, a motor mounted on the upper portion of one wall of said frame and having a driving connection with said spindle, a carriage slidably supported on the forward wall of said frame for movement parallel to said spindle, means for supporting a tool on said carriage, and an automatically disengageable driving connection between said motor and said carriage whereby said carriage may be moved away from the wheel supporting end of said spindle, said connection including a rotatable shaft having a hand wheel thereon and operable manually to move said carriage in either direction.

3. A machine of the character described comprising, in combination, a column adapted for floor mounting, a horizontal spindle rotatably mounted in said column and overhanging one end thereof, means removably secured to the projecting end of said spindle for centering and supporting a wheel and an associated brake drum for rotation by said spindle, a motor supported by the said column and having a driving connection with said spindle, a carriage mounted on one side of said column for movement parallel to the spindle, a tool support on said carriage, and a driving connection between said spindle and said carriage including a pair of change gears for changing their relative speeds of movement.

4. In a machine of the character described having a frame providing a column, a spindle rotatably mounted in said column and extending out of one end wall thereof so as to be adapted to support a wheel having a brake drum thereon, a carriage mounted on the forward side of said column for sliding movement parallel to said spindle and arranged to be driven in timed relation to said spindle, said carriage having tool supporting means thereon, a motor supported on one side wall of said column, a driving connection between said motor and said spindle, said connection including a worm wheel on said spindle within the column, a worm detachably connected to the motor, and a slide supporting said worm within the column and removable with said worm through the forward wall of said column.

5. A machine of the character described having a frame providing a column, a spindle rotatably mounted in said column and extending beyond one end thereof so as to be adapted rotatably to support a wheel and an associated brake drum, a motor mounted on the upper portion of one side of said column, a driving connection between said motor and said spindle including speed change means mounted on one side of said column, a carriage mounted on the forward side of said column for sliding movement parallel to said spindle, and a driving connection between said spindle and said carriage including a pair of pick-off gears for changing the relative speed of movement of said spindle and said carriage.

6. In a machine of the character described, a frame providing a column, a rotatable work spindle, mounted in said column and projecting beyond one end thereof to receive a work piece, a carriage, a pair of vertically spaced guides on the forward side of said column to support and guide said carriage for movement parallel to said spindle, said guides being formed with a horizontal side-opening groove therebetween, a rack positioned in said groove, a stub shaft rotatably mounted in said carriage and projecting into said groove, and a pinion on said shaft engaging said rack whereby said carriage may be moved along said guides.

7. A machine of the character described comprising, in combination, a pedestal adapted for floor mounting, a spindle rotatably mounted in said pedestal and projecting beyond one side thereof to receive and support said work piece, means for rotating said spindle, a carriage mounted on said pedestal for movement parallel to said spindle, a cross slide on said carriage, a fixture mounted on said cross slide for angular adjustment about a vertical axis, said fixture having a pair of spaced horizontal bores formed therein adapted to receive a tool holder or the like, and means for securing such a tool holder in either of said bores.

8. In a machine of the character described, a movable tool slide, a fixture adjustably mounted thereon, said fixture having a pair of spaced parallel bores formed therein, a grinding spindle removably secured in one of said bores, a shaft removably secured in the other of said bores, and a motor carried by said shaft and having a driving connection with said grinding spindle.

9. A machine of the character described comprising, in combination, a column adapted for floor mounting, a horizontal spindle rotatably mounted in said column and overhanging one end thereof, means removably secured to the projecting end of said spindle for centering and supporting a wheel and an associated brake drum for rotation by said spindle, a motor supported by the said column and having a driving connection with said spindle, a carriage mounted on one side of said column for movement parallel to the spindle, a tool support on said carriage, and means driven from said motor for moving said carriage including a pair of change gears for varying the relative speeds of the spindle and carriage.

GUSTAF DAVID SUNDSTRAND.